United States Patent Office  3,119,859
Patented Jan. 28, 1964

3,119,859
ALPHA - HYDROCARBON - BETA POLYIODO, AMINO-METHYLENEAMINO-PHENYL PROPIONIC ACIDS AND ESTERS THEREOF
Hans Priewe, Berlin-Steglitz, and Alexander Poljak, Berlin-Frohnau, Germany, assignors to Schering AG, Berlin, Germany
No Drawing. Filed Apr. 26, 1960, Ser. No. 24,676
Claims priority, application Germany June 20, 1958
13 Claims. (Cl. 260—471)

The present invention relates to X-ray contrast agents or roentgenographic contrast agents, to the use thereof and to the production thereof.

This application is a continuation-in-part of our copending application Serial No. 803,359, filed April 1, 1959, for "Trisubstituted Formamidines," now abandoned.

It is an object of the present invention to provide new X-ray contrast agents and methods of producing the same.

It is a further object of the present invention to provide X-ray contrast agents which are particularly suitable for peroral application and which have a markedly good resorbability.

It is another object of the present invention to provide X-ray contrast agents which have an improved distribution in the gall bladder and which give marked shadows for X-ray purposes.

It is still another object of the present invention to provide for the production of the new contrast agents of the present invention and methods of producing the same.

Other objects and advantages of the present invention will be apparent from a further reading of the specification and of the appended claims.

With the above objects in view, the present invention mainly comprises a compound selected from the group consisting of compounds having the following general formula:

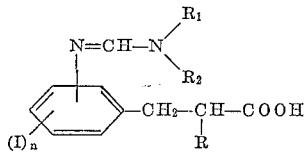

wherein R is selected from the group consisting of hydrogen, alkyl of 1–6 carbon atoms and cycloalkyl of up to 6 carbon atoms, wherein $R_1$ and $R_2$ are each selected from the group consisting of lower alkyl of 1–6 carbon atoms, and together with the N-atom 5 and 6 member heterocyclic rings, and wherein $n$ is a whole number from 2–3, non-toxic, physiologically compatible salts thereof, and compounds having the following general formula:

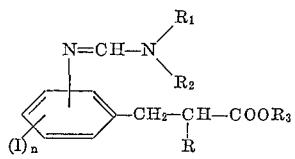

wherein R, $R_1$, $R_2$ and $n$ have the same definitions as above and wherein $R_3$ is selected from the group consisting of alkyl of 1–6 carbon atoms and cycloalkyl of up to 6 carbon atoms.

The X-ray contrast agents of the present invention may be prepared by reacting the known iodinated amino-phenyl-propionic acid, acid addition salt or ester with the chosen N-dialkylated formamide with an acid reaction aiding agent such as phosphorous oxychloride. Other methods can of course be used instead. Obviously in the case of producing the salts the reaction may be carried out with the N-dialkylated formamide and the amino-iso-dophenyl-propionic acid in the form of the free acid and then reaction with a non-toxic, physiologically compatible base to form the salt. Likewise, reaction can be carried out with the free acid and esterification can be subsequently carried out to produce the carboxylic acid esters of the present invention.

The reaction actually proceeds in accordance with the following equation:

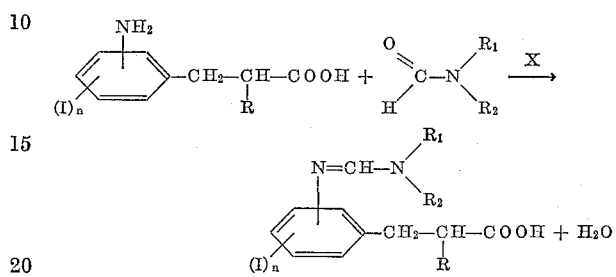

wherein R, $R_1$, $R_2$ and $n$ have the same definitions as above, and wherein X is an acid aiding agent. Among the particularly suitable acid reaction aiding agents X may be mentioned the halogenides of oxygen acids of phosphorus and sulfur such as phosphorus trichloride, phosphorus oxychloride, thionyl chloride, sulfuryl chloride, chlorosulfonic acid, halogenides of organic sulfonic acids, such as benzenesulfonyl chloride, or carbonic acid halogenides such as phosgene and even acetyl chloride, benzoyl chloride and the like. In addition, the so called "ansolvo acids" (see Liebig's Annals, 455, 227 (1927)) such as hydrogen chloride adducts of zinc chloride, etc. These reaction aiding agents correspond to a certain degree to the acidic condensation agents which are used in the Vilsmair aldehyde synthesis, which synthesis can to some extent be compared with the synthesis of the present invention. (Note Houben-Weil, "Methoden der organischen Chemie," 1954, volume 7, pages 29–36.)

The method of the present invention is an exothermic reaction which proceeds extremely smoothly and with good yields. The reaction is generally carried out by first bringing together the chosen primary amine or its acid salt, preferably its chlorohydrate, preferably with an excess of the chosen N-disubstituted formamide, which simultaneously serves instead of or in addition to an inert further solvent, and the chosen condensation agent is then added slowly to the mixture, preferably while maintaining the temperature at approximately 50–60° C. In order to maintain the temperature it may be necessary to utilize a cooling medium. The condensation agent is preferably utilized in substantially equimolar quantities with respect to the utilized primary amine. In view of the great variety of possible suitable condensation agents the possibility exists according to the present invention to choose the condensation agent which gives the optimum results with the particular reactants which are utilized in any particular case. However, it should be strongly noted that even when the typical N-acylation agents such as benzene sulfonyl chloride, benzoyl chloride or phosgene, the expected N-acylation of the utilized primary amine often does not occur, but is instead pushed aside for the preferable amidination reaction of the present invention.

In the above formulas $R_1$ and $R_2$ may be the same or different lower alkyl or cycloalkyl radicals such as methyl, ethyl, n-propyl, isopropyl, butyl, hexyl, cyclopentyl, cyclohexyl or the like, or $R_1$ and $R_2$ together with the nitrogen atom to which they are attached may form a heterocyclic ring radical such as piperidyl, morpholinyl, pyrazolyl, pyrrolidyl, piperazyl, or the like. The substituent R may be hydrogen, a lower alkyl of up to 6 carbon atoms such as methyl, ethyl or the like, or a cycloalkyl of up to 6 carbon atoms.

The substituent $R_3$ which may be introduced into the molecule of the X-ray contrast agents of the present invention either before or after the reaction with the N-dialkylated formamide, may likewise be a lower alkyl or a cycloalkyl of up to 6 carbon atoms.

The above set forth esters of the present invention may be used, the free acids may be used or their non-toxic salts with organic or inorganic bases, particularly those which have a very low toxicity. Among the suitable non-toxic salts of the present invention are salts of non-toxic inorganic bases such as alkali metal salts, e.g., sodium, lithium, etc., ammonium salts, alkaline earth salts such as calcium salts, and salts of non-toxic organic bases such as glucosamine, methylglucosamine, ethanolamine, diethanolamine, glucamine, methylglucamine, ethylamine, diethylamine, etc. among many, many others. These salts are given for illustrative purposes only and it is apparent that the present invention is applicable to all commonly used physiologically compatible salts.

The following examples are given as illustrative of the production of the new compounds of the present invention. It is to be understood that these examples are only given with respect to the production of a certain few selected compounds but that other compounds within the general formula given above may be produced analogously to those compounds set forth in these examples. The scope of the invention is not, therefore, meant to be limited to the specific details of these examples.

EXAMPLE 1

25 g. of α-ethyl-β-(3-amino-2,4,6-triiodophenyl)-propionic acid are dissolved in 25 cc. of dimethylformamide and 6.72 g. of phosphorous oxychloride are added thereto dropwise under stirring. The strong exothermic reaction mixture is immersed in an ice water bath to maintain the reaction temperature at 55° C. After completion of the dropwise addition the reaction mixture is heated for an additional 1 hour at a temperature of 55° C. This results in the beginning of a precipitation of a white precipitate of the honey-like reaction material. After cooling, the reaction mass is taken up in acetone, the precipitated chlorohydrate of the amidine is filtered off by suction, washed with acetone and dried. The chlorohydrate is dissolved in hot water at a temperature of 60° C., filtered, cooled to room temperature, and the solution is mixed with aqueous sodium hydroxide to a pH of 5–6 resulting in the precipitation of the inner salt of α-ethyl-β-(3 - dimethylaminomethyleneamino - 2,4,6 - triiodophenyl)-propionic acid. Upon drying in air the substance contains approximately 1% of water and decomposes at about 75° C. without a characteristic melting point. The yield is 24 g. (87% of the theoretical).

17 g. of α-methyl-β-(3-dimethylaminomethyleneamino-2,4,6-triiodophenyl)-propionic acid having a melting point of 120–122° C. (under decomposition) are produced in an analogous manner from 27.8 g. of α-methyl-β-(3-amino-2,4,6-triiodophenyl)-propionic acid, the reaction product being precipitated from ether-petroleum ether. The yield corresponds to 56% of the theoretical.

EXAMPLE 2

1100 g. of β-(3-amino-2,4,6-triiodophenyl)-propionic acid are dissolved in a mixture of 2470 cc. of dimethylformamide and 1235 cc. of chloroform. A mixture of 312 g. of phosphoroxychloride and 450 cc. of chloroform are added dropwise under stirring at a temperature of 0° to +10° C. After the end of the addition the reaction mixture is stirred for an additional three hours at room temperature and the separated reaction product is then filtered off by suction and washed with chloroform and acetone. By dissolving this reaction product in 5 liters of water with sodium hydroxide to a pH of 8 and the pH is then adjusted with dilute hydrochloric acid to a pH of 5.5 resulting in precipitation. The precipitate is filtered off by suction and recrystallized from ethanol and then dried in air. There is thus obtained 1000 g. of β - (3 - dimethylaminomethylene-amino-2,4,6-triiodophenyl)-propionic acid having a melting point of 168–169° C. The yield corresponds to 82.5% of the theoretical.

The advantages of the new X-ray contrast agents of the present invention are evident particularly by a very low toxicity, a markedly good resorbability upon peroral application and a considerably better gall bladder distribution with simultaneously better contrast transmission. Consequently the new compounds of the present invention are particularly useful as shadow-giving substances in X-ray contrast compositions for peroral cholecystography. By suitable working up the compounds of the present invention are also usable as roentgenographic agents for other body portions or organs. Depending upon the particular purpose for which the compounds is ot be used the compound may be used as their free acid, as their non-toxic salts with inorganic or organic bases, or as their esters. For peroral cholecystography the compounds may be worked up into the form of dragees, or the like.

The advantages of the new compounds of the present invention is evident upon comparison thereof with already known contrast agents in aminal tests. By comparison of the present invention compound (I) α-ethyl-β - (3 - dimethylamino - methylamino - 2,4,6 - triiodophenyl)-propionic acid with the corresponding known (II) α - ethyl - β - (3 - amino - 2,4,6 - triiodophenyl)-propionic acid, the following values are obtained:

*Table 1*

| | $LD_{50}$ | | Distribution in percent after 24 hours, after 200 mg./kg. i.d. in rabbits. | |
|---|---|---|---|---|
| | i.v., mg./kg. | p.o., mg./kg. | Gall | Urine |
| (I) | 490 | 2,500 | 86.3 | 0.2 |
| (II) | 320 | 2,450 | 26.0 | 16.0 | i.v.=intravenous.
i.d.=intraduodenal.
p.o.=per os.

By comparison of the present invention compound (III) β - (3 - dimethylamino - methyleneamino - 2,4,6-triiodophenyl)-propionic acid and the present invention compound (I) α - ethyl - β - (3 - dimethylamino - methyleneamino-2,4,6-triiodophenyl)-propionic acid with the known compound (IV) β-(3-amino-2,4,6-triiodophenyl)-propionic acid, the following values are obtained:

*Table 2*

| | $LD_{50}$, i.v., mg./kg. | Gall distribution in percent after intraduodenal administration of 100 mg./kg. in rats, after— | | |
|---|---|---|---|---|
| | | 1 Hour | 3 Hours | 4 Hours |
| (III) | 440 | 16.7 | 69.4 | 81.9 |
| (I) | 490 | 13.4 | 63.1 | 73.6 |
| (IV) | 375 | 6.6 | 13.5 | 20.9 |

Further comparison of the known compound (II) α - ethyl - β - (3 - amino - 2,4,6 - triiodophenyl) - propionic acid with the present invention compounds (V) α - ethyl - β - (3 - N - diethylamino - methyleneamino-2,4,6 - triiodophenyl) - propionic acid, (VI) α - ethyl-β - (3 - N - piperidino - methyleneamino - 2,4,6 - triiodophenyl)-propionic acid, and (VII) α-ethyl-β-(3-N-morpholino - methyleneamino - 2,4,6 - triiodophenyl) - propionic acid give the following values:

*Table 3*

|        | LD$_{50}$ i.v., mg./kg. | LD$_{50}$ p.o., mg./kg. | Gall distribution in percent, after 100 mg./kg. intraduodenal in awake dogs | |
|--------|---------|---------|-----------|----------|
|        |         |         | In the gall | In the urine |
| (II)   | 320     | 2,500   | 11.1      | 3.8      |
| (V)    | 448     | 1,500   | 42.0      | 4.8      |
| (VI)   | 200     | 2,000   | 43.0      | 7.4      |
| (VII)  | 305     | 1,500   | 22.0      | 12.0     |

Advantages of the compounds of the present invention are further apparent from the following animal tests in which comparisons were made with the present invention compound (VIII) β - (3 - N - piperidino - methyleneamino - 2,4,6 - triiodophenyl) - propionic acid, the present invention compound (IX) β-(3-N-morpholinomethyleneamino - 2,4,6 - triiodophenyl) - propionic acid and the known compound (X) β-3-amino-2,4,6-triiodophenyl)-propionic acid, which gave the following results:

*Table 4*

|         | LD$_{50}$, i.v., mg./kg. | Gall distribution in percent after administration of 100 mg./kg. in rats, after— | | |
|---------|-------------|--------|---------|---------|
|         |             | 1 Hour | 2 Hours | 3 Hours |
| (VIII)  | 215         | 8.9    | 28.0    | 46.5    |
| (IX)    | 388         | 18.2   | 41.9    | 59.4    |
| (X)     | 375         | 6.6    |         | 13.5    |

It will be noted that although compound (VIII) has a higher toxicity than compound (X), the absolute value of the toxicity of compound (VIII) of the present invention is still extremely good and most important the gall distribution of compound (VIII) of the present invention is far better than that of compound (X). Furthermore, the toxicity of compound (X) as given in the table is somewhat deceiving. Compound (X) when given in peroral heating of rats precipitates in the gall as thick white crystalline precipitate and as a result obstructs the bile duct. Consequently compound (X) is absolutely unsuitable as an oral X-ray contrast agent. Still further, since the LD$_{50}$ of the still living 50% of the test animals is given after 3 days, the bile duct clogging caused by compound (X) which causes illness and death in the test animals only after the 3 days is not measured in the usual toxicity tests. Most important, none of these disadvantages of compound (X) occur with the compounds of the present invention.

The esters of the present invention are also extremely useful compounds having particular advantages. Thus, the esters in comparison to the known nucleous-iodinated β-(amino-phenyl)-propionic acid have at least the same activity and in many respects the compounds of the present invention have superior and increased activity. A further particular advantage of these compounds is in the fact that they are practically completely tasteless while the known compounds, particularly their salts, in general have a very unpleasant bitter taste which makes it necessary to use capsules or dragees for peroral application.

The surprisingly good resorbability of the esters of the present invention upon peroral application is evidenced by animal tests. Thus, in the case of an awake dog to which 100 mg./kg. of β-(3-dimethylamino-methylene amino-2,4,6-triiodophenyl)-propionic acid-methyl-ester has been administered perorally 33.5% separates through the gall. Under the same conditions 37.6% of β - (3 - dimethylamino - methyleneamino - 2,4,6 - triiodophenyl)-propionic acid-ethyl ester separates through the gall while, for example, upon application of β-(amino-2,4,6-triiodophenyl)-propionic acid-ethyl ester practically no resorption occurs.

Still better results are obtained with respect to the resorption ratio in the case of humans which upon peroral administration of 1.0 g. of β-(3-dimethylamino-methyleneamino-2,4,6-triiodophenyl)-propionic acid-methyl ester after 24 hours show 83% separation. The corresponding values for the β-(3-dimethylamino-methyleneamino-2,4,6-triiodophenyl)-propionic acid-ethyl ester is 70%, whereby the separation was determined based upon the known re-resorption, always in the 24 hour urine.

The esters of the present invention also show marked superiority with respect to the toxicity thereof in comparison to the known substances which are used for peroral cholecystography. Thus, the LD$_{50}$ upon peroral administration of β-(3-dimethylamino-methyleneamino-2,4,6-triiodophenyl)-propionic acid-methyl ester is 10 g./kg. in rats, the corresponding value for β-(3-dimethylamino-methyleneamino - 2,4,6 - triiodophenyl)-propionic acid-ethyl ester is 4 g./kg., for β-(3-morpholino-methyleneamino-2,4,6-triiodophenyl)-propionic acid-ethyl ester-chlorohydrate and for β-(3-N-piperidino-methyleneamino-2,4,6-triiodophenyl)-propionic acid-ethyl ester-chlorohydrate is 8 g./kg.

The esters of the present invention may be used either in the form of free esters or in the form of their acid addition salts with non-toxic inorganic and/or organic acids. All common inorganic and organic acids which are used for this purpose, for example hydrochloric acid, phosphoric acid, tartaric acid, etc. may be used for this purpose.

Further animal tests on awake dogs to which were perorally administered 100 mg./kg. of various compounds showed that the present invention compound α-ethyl-β-(3-N-morpholino-methyleneamino - 2,4,6 - triiodophenyl)-propionic acid-ethyl ester-chlorohydrate resulted in a 27.7% separation through the gall while under the same conditions the administrations of the present invention compound α-methyl-β-(3-N-morpholino-methyleneamino-2,4,6-triiodophenyl)-propionic acid-ethyl ester-chlorohydrate resulted in a 22.8% separation through the gall.

Further toxicity test on rats comparing compounds of the present invention with known peroral cholecystography compounds showed that the LD$_{50}$ upon peroral administration of the present invention compound α-ethyl-β-(N-morpholino - methyleneamino - 2,4,6 - triiodophenyl)-propionic acid-ethyl ester chlorohydrate is 8 g./kg. and this very surprisingly low toxicity is the same for α-ethyl-β-(3-N-piperidino-methyleneamino - 2,4,6 - triiodophenyl)-propionic acid-ethyl ester-chlorohydrate, for α-methyl-β-(3-N-piperidino-methyleneamino - 2,4,6 - triiodophenyl)-propionic acid-ethyl ester-chlorohydrate, for α-ethyl-β-(3-N-piperidino - methyleneamino - 2,4,6 - triiodophenyl)-propionic acid-ethyl ester-chlorohydrate, and for α-ethyl - β - (3-dimethylamino-methyleneamino-2,4,6-triiodophenyl)-propionic acid-ethyl ester-chlorohydrate.

The following examples are given to illustrate various X-ray contrast compositions in accordance with the present invention. The scope of the invention is not, however, meant to be limited to the specific examples.

EXAMPLE 3

5 kg. of α-methyl-β-(3-dimethylaminomethyleneamino-2,4,6-triiodophenyl)-propionic acid is kneaded with 2 liters of starch paste containing 100 g. of corn starch, a kneading machine being used for this purpose. The wet mass is granulated in the usual manner in a granulation machine and dried under vacuum. The finished granulate is then mixed with 0.5 kg. of corn starch and 25 g. of magnesium stearate and pressed into tablets each containing 500 mg. of the active ingredients.

EXAMPLE 4

The very water-soluble sodium salt of α-methyl-β-(3-dimethylaminomethyleneamino - 2,4,6 - triiodophenyl)-propionic acid are introduced into gelatin capsules. Each capsule contains 750 mg. of the active ingredients. For machine filling of the capsules the sodium salt can be worked up with 40% of paraffin oil to a flowable paste.

EXAMPLE 5

The granulate obtained according to Example 3 is formed into dragees by the application of 20% of its weight of sugar syrup in a dragee-forming vessel, and the dragees are subsequently waxed.

EXAMPLE 6

1.25 kg. of β-(3-dimethylaminomethyleneamino-2,4,6-triiodophenyl)-propionic acid are kneaded with 0.5 liter of starch paste which contains 25 g. of corn starch, the kneading taking place in a kneading machine. The wet mass is granulated in a granulation machine in the usual manner and dried under vacuum. The finished granulate is then mixed with 0.125 kg. of corn starch and 6 g. of magnesium stearate and pressed into tablets each of which contains 500 mg. of the active substance.

EXAMPLE 7

The very water-soluble sodium salt of β-(3-dimethylaminomethyleneamino - 2,4,6 - triiodophenyl)-propionic acid is introduced into gelatin capsules. Each capsule contains 750 mg. of the active ingredient. For machine filling of the capsules the sodium salt can be worked up with 40% paraffin oil to a flowable paste.

EXAMPLE 8

The granulate produced according to Example 6 is worked up into dragees along with 20% by weight thereof of sugar syprup, the dragees subsequently being waxed.

EXAMPLE 9

3 g. of β-(3-dimethylamino-methyleneamino-2,4,6-triiodophenyl)-propionic acid-calcium salt, 2.5 g. of sugar, 25 mg. of sodium lauryl sulfonate, 200 mg. of sodium carboxymethyl cellulose and 25 mg. of a taste correcting substance are thoroughly mixed and after shaking with 25 cc. of water can be easily ingested.

EXAMPLE 10

5 kg. of α-ethyl-β-(3-N-diethylaminomethyleneamino-2,4,6-triiodophenyl)-propionic acid are kneaded with 2 liters of starch paste containing 100 g. of corn starch, a kneading machine being used for this purpose. The wet mass is granulated in the usual manner in a granulation machine and dried under vacuum. The finished granulate is then mixed with 0.5 kg. of corn starch and 25 g. of magnesium stearate and pressed into tablets each containing 500 mg. of the active ingredients.

EXAMPLE 11

The very water-soluble sodium salt of α-ethyl-β-(3-N-piperidino - methyleneamino-2,4,6-triiodophenyl)-propionic acid are introduced into gelatin capsules. Each capsule contains 750 mg. of the active ingredient. For machine filling of the capsule the sodium salt can be worked up with 40% of paraffin oil to a flowable paste.

EXAMPLE 12

The granulate obtained according to Example 10 is formed into dragees by the application of 20% of its weight of sugar syrup in a dragee-forming vessel, and the dragees are subsequently waxed.

EXAMPLE 13

1.25 kg. of β-(3-N-piperidino-methyleneamino-2,4,6-triiodophenyl)-propionic acid are kneaded with 0.5 liter of starch paste which contains 25 g. of corn starch, the kneading taking place in a kneading machine. The wet mass is granulated in a granulation machine in the usual manner and dried under vacuum. The finished granulate is then mixed with 0.125 kg. of corn starch and 6k. of magnesium stearate and pressed into tablets each of which contain 500 mg. of the active substance.

EXAMPLE 14

The very water-soluble sodium salt of β-(3-N-morpholino - methyleneamino - 2,4,6-triiodophenyl)-propionic acid is introduced into gelatin capsules. Each capsule contains 750 mg. of the active ingredients. For machine filling of the capsule the sodium salt can be worked up with 40% paraffin oil to a flowable paste.

EXAMPLE 15

The granulate produced according to Example 13 is worked up into dragees along with 20% by weight thereof of sugar syrup, these dragees subsequently being waxed.

EXAMPLE 16

5 kg. of β-(3-dimethylamino-methyleneamino-2,4,6-triiodophenyl)-propionic acid-methyl ester are kneaded with 2 liters starch paste containing 100 g. of corn starch, a kneading machine being used for this purpose. The wet mass is granulated in the usual manner in a granulation machine and dried under vacuum. The finished granulate is then mixed with 0.5 kg. of corn starch and 6 g. of magnesium stearate and pressed into tablets each containing 500 mg. of the active ingredient.

EXAMPLE 17

The granulate obtained by treating the 5 kg. of β-(3-N - morpholino - methyleneamino-2,4,6-triiodophenyl)-propionic acid-ethyl ester-chlorohydrate as in Example 16 is formed into dragees by the application of 20% of its weight of sugar syrup in a dragee forming vessel, and the dragees are subsequently waxed.

EXAMPLE 18

1.25 kg. of α-methyl-β-(3-diethylamino-methyleneamino-2,4,6-triiodophenyl)-propionic acid-ethyl ester are kneaded with 0.5 liter of starch paste which contains 25 g. of corn starch, the kneading taking place in a kneading machine. The wet mass is granulated in a granulation machine in the usual manner and dried under vacuum. The finished granulate is then mixed with 125 g. of corn starch and 6 g. of magnesium stearate and pressed into tablets each of which contains 500 mg. of the active substance.

EXAMPLE 19

The granulate obtained by treating 5 kg. of α-methyl-β - (3 - dimethylamino-methyleneamino-2,4,6-triiodophenyl)-propionic acid-methyl ester is worked up into dragees along 20% by weight thereof of sugar syrup, in a dragee-forming vessel, and the dragees are subsequently waxed.

EXAMPLE 20

The sodium salt of α-hexyl-β-(3-dipropylamino-methyleneamino-2,4,6-triiodophenyl)-propionic acid is filled into gelatin capsules. Each capsule contains 700 mg. of the active ingredient. For machine filling of capsules the sodium salt can be worked up with 40% paraffin oil to a flowable paste.

EXAMPLE 21

2.5 kg. of β-(3-dihexylamino-methyleneamino-2,4,6-triiodophenyl)-propionic acid with 1 liter of starch paste which contains 50 g. of corn starch are kneaded in a kneading machine. After the granulation of the wet mass in a granulation machine it is dried under vacuum, mixed with 0.25 kg. of corn starch and 12 g. of magnesium stearate and pressed into tablets each of which contain 500 mg. of the active ingredient.

EXAMPLE 22

The granulate which is obtained by treating 5 kg. of α - butyl-(β-3-pyrrolidino-methyleneamino-diiodophenyl)- propionic acid-ethyl ester as described in Example 21 are formed into dragees in a dragee-forming vessel using 20% of its weight of sugar syrup, and the dragees are subsequently waxed.

EXAMPLE 23

The sodium salt of α-propyl-β-(3-dihexyl-amino-methyleneamino-2,4,6-triiodophenyl)-propionic acid is worked up in the same manner as the sodium salt of α-hexyl-β-(3-dipropylamino-methyleneamino - 2,4,6 - triiodophenyl)-propionic acid in Example 20. The methylglucamine salts of the compounds of Example 20 or 23 can be used instead of the sodium salt in the same manner.

EXAMPLE 24

1000 g. of β-(3-dimethylaminomethylene-amino-2,4,6-triiodophenyl)-propionic acid, produced according to Example 2 are suspended in 2000 cc. of water and then adjusted with the equivalent of sodium hydroxide to a pH of 7. The solution thus obtained is filtered and mixed with 25 liters of acetone, resulting in the precipitation of the sodium salt of β-(3-dimethylaminomethylene-amino-2,4,6-triiodophenyl)-propionic acid. The precipitate is filtered off by suction, suspended in 2000 cc. of acetone, filtered again by suction and dried at 100° C. There is thus obtained 1000 g. of the sodium salt having a melting point of 303–304° C. (under decomposition). The yield corresponds to 95.5% of the theoretical.

EXAMPLE 25

50 g. of β-(3-dimethylaminomethylene-amino-2,4,6-triiodophenyl)-propionic acid, produced according to Example 2 are suspended in 300 cc. of ethanol. After addition of 7.5 cc. of sulfuric acid the mixture is heated under reflux, resulting a clear solution. This solution was cooled and filtered, the precipitate dissolved in 320 cc. ethanol and the solution, thus obtained upon slight warming is added dropwise under stirring and cooling into 600 cc. 15% aqueous sodium hydroxide. After several hours of continuous stirring the precipitate is filtered off by suction and recrystallized from ethanol. There is thus obtained 37 g. of ethyl β-(3-dimethylaminomethylene-amino-2,4,6-triiodophenyl)-propionate having a melting point of 72°. The yield corresponds to 75% of the theoretical.

EXAMPLE 26

25 g. of α-ethyl-β-(3-amino-2,4,6-triiodophenyl)-propionic acid are dissolved in 50 cc. N-formyl-morpholine and 4.0 cc. of phosphorous oxychloride are added thereto dropwise under stirring. The strong exothermic reaction mixture is immersed in an ice water bath to maintain the reaction temperature at 60° C. After completion of the dropwise addition the reaction mixture is heated for additional 30 minutes at a temperature of 60° C. This results in partial solidification. After cooling, the reaction mixture is suspended in acetone and filtered by suction. The precipitate, thus obtained, is dissolved in dilute ammonium hydroxide and the solution is mixed with aqueous acetic acid to a pH of 4 resulting in the precipitation of the inner salt of α-ethyl-β-(3-N-morpholinomethylene-amino-2,4,6-triiodophenyl) - propionic acid. Upon drying in air the substance contains approximately 1% of water and decomposes at about 85° C. without a characteristic melting point. The yield is 20 g. (68% of the theoretical) 20 g. of this acid are dissolved in 100 cc. of ethanol. After addition of 5 cc. sulfuric acid the mixture is heated under reflux for a period of 3 hours. The solution thus obtained is poured into ice-water, made strongly alkaline by addition of 50 cc. 40% aqueous sodium hydroxide solution and extracted with diethyl ether. The extracts are washed with water, dried with anhydrous sodium sulfate and the ether removed by distillation. Crude ethyl α-ethyl-β-(3-N-morpholinomethylene-amino - 2,4,6-triiodophenyl)-propionate is obtained as a yellow oil, which do not solidify on standing. This product is dissolved in dry diethyl ether and the solution is mixed with a slight excess of ethanolic hydrochloric acid, resulting in the precipitation of the hydrochloric addition salt of ethyl α-ethyl-β-(3-N-morpholinomethylene-amino - 2,4,6-triiodophenyl)-propionate, having a melting point of 210–211° C. (under decomposition). The yield (17 g.) corresponds to 78% of the theoretical.

Without further analysis, the foregoing will so fully reveal the gist of the present invention that others can, by applying current knowledge readily adapted it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound selected from the group consisting of compounds of the formula:

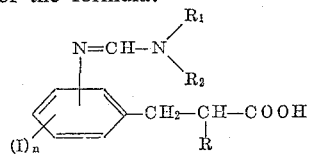

wherein R is selected from the group consisting of hydrogen, alkyl of 1–6 carbon atoms and cycloalkyl of up to 6 carbon atoms, wherein $R_1$ and $R_2$ are each selected from the group consisting of lower alkyl of 1–6 carbon atoms, and together with the N-atom piperidyl, morpholinyl, pyrazolyl, pyrrolidyl and piperazyl, and wherein $n$ is a whole number from 2–3; non-toxic, physiologically compatible salts thereof; compounds of the formula:

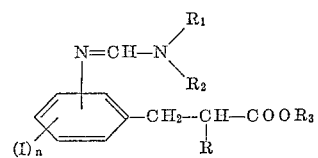

wherein R, $R_1$ and $R_2$ and $n$ have the same definitions as above and wherein $R_3$ is selected from the group consisting of alkyl of 1–6 carbon atoms and cycloalkyl of up to 6 carbon atoms; and non-toxic acid addition salts thereof.

2. A compound of the formula:

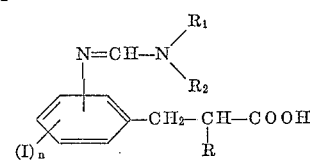

wherein R is hydrogen, wherein $R_1$ is lower alkyl, wherein $R_2$ is lower alkyl and wherein $n$ is 3.

3. A compound of the formula:

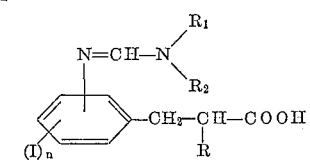

wherein R is lower alkyl, wherein $R_1$ is lower alkyl, wherein $R_2$ is lower alkyl and wherein $n$ is 3.

4. A compound of the formula:

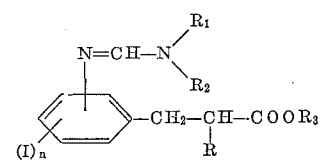

wherein R is hydrogen, wherein $R_1$ is lower alkyl, wherein $R_2$ is lower alkyl, wherein $R_3$ is lower alkyl and wherein $n$ is 3.

5. A compound of the formula:

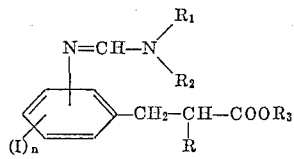

wherein R is lower alkyl, wherein $R_1$ is lower alkyl, wherein $R_2$ is lower alkyl, wherein $R_3$ is lower alkyl and wherein $n$ is 3.

6. β-(3-dimethylamino-methyleneamino-2,4,6 - triiodophenyl)-propionic acid.

7. The sodium salt of β-(3-dimethylamino-methyleneamino-2,4,6-triiodophenyl)-propionic acid.

8. The calcium salt of β-(3-dimethylamino-methyleneamino-2,4,6-triiodophenyl)-propionic acid.

9. β-(3-dimethylamino-methyleneamino-2,4,6 - triiodophenyl)-propionic acid-ethyl ester.

10. α-Methyl-β-(3-dimethylamino-methyleneamino - 2,4,6-triiodophenyl)-propionic acid.

11. α-Ethyl-β-(3-dimethylamino-methylenamino - 2,4,6-triiodophenyl)-propionic acid.

12. A compound of the formula:

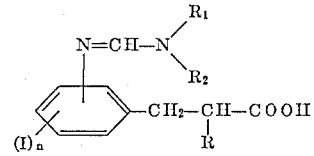

wherein R is cycloalkyl of up to 6 carbon atoms, wherein $R_1$ is lower alkyl, wherein $R_2$ is lower alkyl and wherein $n$ is 3.

13. A compound of the formula:

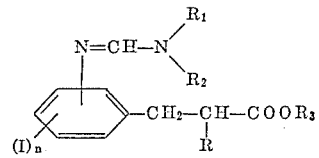

wherein R is cycloalkyl of up to 6 carbon atoms, wherein $R_1$ is lower alkyl, wherein $R_2$ is lower alkyl, wherein $R_3$ is lower alkyl and wherein $n$ is 3.

No references cited.